United States Patent
Allen et al.

(10) Patent No.: US 8,417,206 B2
(45) Date of Patent: Apr. 9, 2013

(54) METHODS AND SYSTEMS FOR BLENDING BETWEEN STEREO AND MONO IN A FM RECEIVER

(75) Inventors: John L. Allen, Dripping Springs, TX (US); Javier Elenes, Austin, TX (US); Gerald D. Champagne, Buda, TX (US)

(73) Assignee: Silicon Laboratories Inc., Austin, TX (US)

( * ) Notice: Subject to any disclaimer, the term of this patent is extended or adjusted under 35 U.S.C. 154(b) by 319 days.

(21) Appl. No.: 12/799,983

(22) Filed: May 6, 2010

(65) Prior Publication Data
US 2011/0275339 A1 Nov. 10, 2011

(51) Int. Cl.
*H04B 1/30* (2006.01)

(52) U.S. Cl. ........... 455/296; 455/67.13; 455/67.11; 455/222; 455/226.3

(58) Field of Classification Search ............. 455/296, 455/226.3, 222, 67.13, 67.11
See application file for complete search history.

(56) References Cited

U.S. PATENT DOCUMENTS

| 4,703,501 | A | * | 10/1987 | Sugai et al. ............. 381/10 |
| 7,272,375 | B2 | | 9/2007 | Tuttle et al. |
| 2009/0203344 | A1 | | 8/2009 | Hanawalt et al. |

* cited by examiner

*Primary Examiner* — Junpeng Chen
(74) *Attorney, Agent, or Firm* — O'Keefe, Egan, Peterman & Enders LLP (57) ABSTRACT

Methods and systems for blending the audio output from a received FM signal between stereo and mono in which the L−R (left-minus-right) gain of the FM MPX may be adjusted as a function of RF signal to noise ratio (SNR) and the L+R (left-plus-right) noise level. During blending, the L−R gain based on the RF SNR and L+R noise may be reduced in a manner such that the total noise is kept substantially constant throughout the stereo-to-mono blend region.

29 Claims, 6 Drawing Sheets

METHODS AND SYSTEMS FOR BLENDING BETWEEN STEREO AND MONO IN A FM RECEIVER

FIELD OF THE INVENTION

This invention relates to stereo receivers and, more particularly, to stereo/mono blending during playback of FM stereo broadcasts.

BACKGROUND OF THE INVENTION

Broadcast channels in the FM band (e.g., about 76 MHz to 108 MHz) are often transmitted with an FM stereo multiplex (MPX) format where the MPX signal includes left (L) channel and right (R) channel information that can then be used by an FM receiver to produce stereo audio outputs. In particular, the FM stereo MPX signal format includes L+R (left-plus-right) information, L−R (left-minus-right) information and a 19 KHz pilot tone. With respect to the center frequency of the broadcast channel, the L+R information lies in a band between 30 Hz and 15 KHz from the center frequency in the broadcast channel. The L−R information lies in two bands on either side of 38 KHz from the center frequency of the broadcast channel, namely a first band between 23 KHz and 38 KHz and a second band between 38 KHz and 53 KHz. And the pilot tone sits at 19 KHz from the center frequency of the broadcast channel. Most FM receivers will produce a full stereo output by generating a left (L) channel audio output by adding the L+R and L−R signals ((L+R)+k*(L−R)=2L when k=1) and a right (R) channel audio output signal by subtracting the L+R and L−R signals ((L+R)−k*(L−R)=2R when k=1). If a mono output is desired or selected, most FM receivers will drive k to 0 in order to pass the full (L+R) signal to both the left (L) channel and the right (R) channel. In addition, varying degrees of a blend from stereo to mono can also be provided by adjusting or varying k from 1 to 0 to provide the desired level of a blend from stereo to mono.

FM broadcast band receivers can suffer from noise due to strong nearby blockers and/or other sources or conditions, and this noise or interference will often show up as static in the stereo audio output for the tuned FM channel. Techniques have been proposed before to mitigate this stereo noise. One prior technique is to use a receive signal strength indicator (RSSI) to blend the audio output from stereo to mono when the RSSI indicates poor signal strength. Another prior technique is to use a signal-to-noise ratio (SNR) measurement of the incoming signal to blend from stereo to mono when the SNR is low. The SNR measurement can be made, for example, by analyzing the amplitude modulation in the received FM broadcast signal. In addition, other solutions have proposed blending to mono based upon an analysis of variations in the FM pilot tone and/or an analysis of high frequency components that are above the frequencies for the FM information in the tuned signals.

Figure 1:
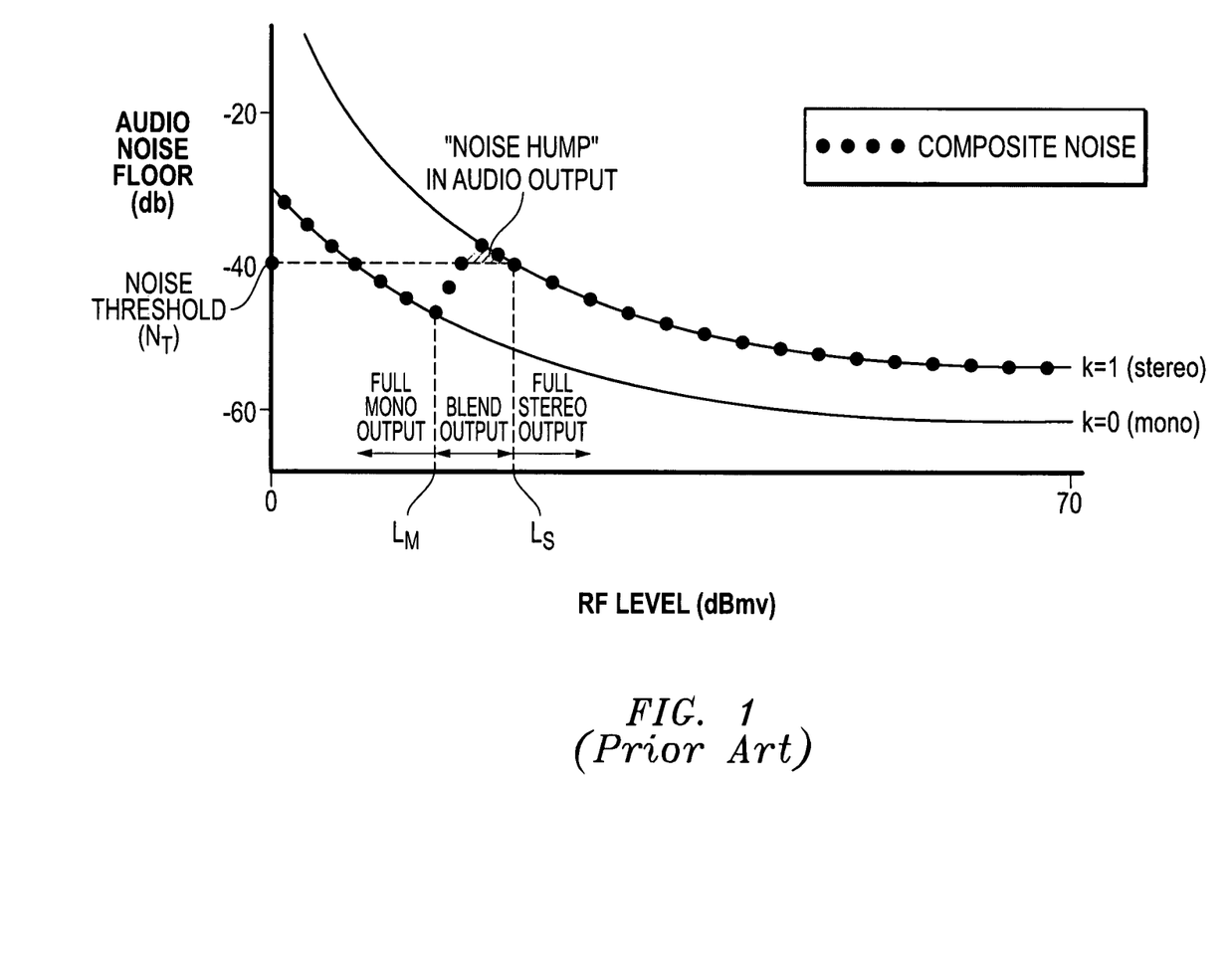
FIG. 1 illustrates a plot of audio noise floor versus received RF strength that is typical of the results of a conventional prior art technique for blending from stereo to mono.

FIG. 1 illustrates a plot of audio noise floor versus received RF strength that is typical of the results of a conventional prior art technique for blending from stereo to mono based on SNR measurement of a received incoming FM radio frequency (RF) signal. As shown in FIG. 1, the audio output is selected to transition between full stereo (k=1) and full mono (k=0) based on received RF level. In particular, audio output is selected to be full stereo (k=1) for received RF level values greater than or equal to minimum full stereo RF level $L_S$ and is selected to be full mono (k=0) for received RF level values less than or equal to maximum full mono RF level $L_M$. At received RF levels between $L_S$ and $L_M$ the audio output is blended between stereo and mono as shown. In FIG. 1, the minimum full stereo level ($L_S$) intersects the full stereo (k=1) curve at an audio noise threshold ($N_T$) where blending from full stereo to mono begins. Threshold $N_T$ represents the noise level above which full stereo audio output is undesirable and blending between stereo and mono should occur to make the listening experience more pleasurable. This is because for a given noise level, more noise is present in the L−R data than in the corresponding L+R data.

Still referring to FIG. 1, the typical prior art transition from full stereo to full mono between $L_S$ and $L_M$ occurs in a manner that allows the audio output curve to exceed the selected audio noise threshold ($N_T$) while in full or partial stereo in the blend region immediately below $L_S$ before eventually dropping beneath $N_T$ in the portion of the blend region closer to $L_M$. This produces a "noise hump" in the composite noise curve, i.e., the non-coherent sum of the noise from the L+R channels and the L−R channels such that the noise when in full stereo is approximately the L+R noise. This noise hump is produced in the composite noise curve above $N_T$ in the blend region between $L_S$ and $L_M$ as shown. The consequence of this hump is increased noise level in parts of the blend region closer to $L_S$ while audio output is in full or partial stereo mode. To compensate for this hump in the composite noise curve where audio output noise would otherwise exceed $N_T$, blending from full stereo must be initiated at a higher RF level ($L_S$) than illustrated in FIG. 1 to ensure that the audio output remains below the desired $N_T$ value while in the blend region. Thus, in the example of FIG. 1, if the actual desired audio noise threshold $N_T$ corresponding to $L_S$ is selected as −40 dB, the composite noise curve will exceed −40 dB in the shaded area of the hump near $L_S$ while in full or partial stereo mode unless a substitute value of $L_S$ is selected that corresponds to an audio noise floor that is sufficiently below the actual desired value of $N_T$ so that the audio output does not exceed the actual desired $N_T$ while in full or partial stereo mode.

SUMMARY OF THE INVENTION

Disclosed herein are methods and systems for blending the audio output from a received FM signal (e.g., about 76 MHz to 108 MHz) between stereo and mono. Using the disclosed methods and systems, the L−R (left-minus-right) gain of the FM MPX may be adjusted as a function of RF SNR and the L+R (left-plus-right) noise level. In particular, given that the audio noise in both the L−R and L+R signals increases (e.g., on a dB by dB basis) as the RF SNR decreases, the disclosed methods and systems may be implemented to reduce the L−R gain based on the RF SNR and L+R noise in a manner such that the total noise is kept substantially constant throughout the stereo-to-mono blend region. In one exemplary embodiment, adjusting the L−R gain in this manner allows blending to be initiated at a lower RF level such that audio output of a FM stereo receiver remains in full stereo separation mode down to a lower RF signal level (and to a lower RF SNR) than is possible using prior art blending methods without exceeding a given $N_T$ and while maintaining and maximizing audio SNR. A further advantage of the disclosed methods and systems is that noise level in the audio output increases in a substantially monotonic manner such that the increasing noise in the audio output is less objectionable and a better listening experience is provided than as is the case with prior art blending techniques.

In one respect, disclosed herein is a method for blending between stereo and mono signal output in FM broadcast receivers, including: receiving an FM channel having a spectrum including L+R (left-plus-right) energy and L−R (leftminus-right) energy; determining a radio frequency (RF) signal-to-noise ratio (SNR) of the received FM channel; determining a L−R gain ($G_{LMR}$) of the received FM channel as a function of RF SNR and the L+R (left-plus-right) noise level; and controlling the blending from a stereo output signal into a mono output signal based on the determined $G_{LMR}$.

In another respect, disclosed herein is an FM broadcast receiver system, including: analog receive circuitry configured to receive an FM channel having a spectrum including L+R (left-plus-right) energy and L−R (left-minus-right) energy; conversion circuitry configured to receive analog signals from the receive circuitry and to output digital signals including L+R energy and L−R energy; and digital signal processing (DSP) circuitry coupled to receive the digital signals from the conversion circuitry, the DSP circuitry being configured to determine a radio frequency (RF) signal-to-noise ratio (SNR) of the received FM channel, determine a L−R gain ($G_{LMR}$) of the received FM channel as a function of RF signal to noise ratio (SNR) and the L+R (left-plus-right) noise level, and control blending from a stereo output signal into a mono output signal based on the determined $G_{LMR}$.

BRIEF DESCRIPTION OF THE DRAWINGS

It is noted that the appended drawings illustrate only example embodiments of the invention and are, therefore, not to be considered limiting of its scope, for the invention may admit to other equally effective embodiments.

DESCRIPTION OF ILLUSTRATIVE EMBODIMENTS

An example integrated low-IF (intermediate frequency) FM receiver, for which the described embodiments may be useful, is described in U.S. Pat. No. 7,272,375, which is hereby incorporated herein by reference in its entirety. Other information regarding blending of a stereo signal into a mono signal within a FM receiver may be found in U.S. patent application Ser. No. 12/313,044 by Hanawalt et al., filed Nov. 17, 2008 (U.S. Patent Publication 20090203344), which is also incorporated herein by reference in its entirety.

Figure 2:
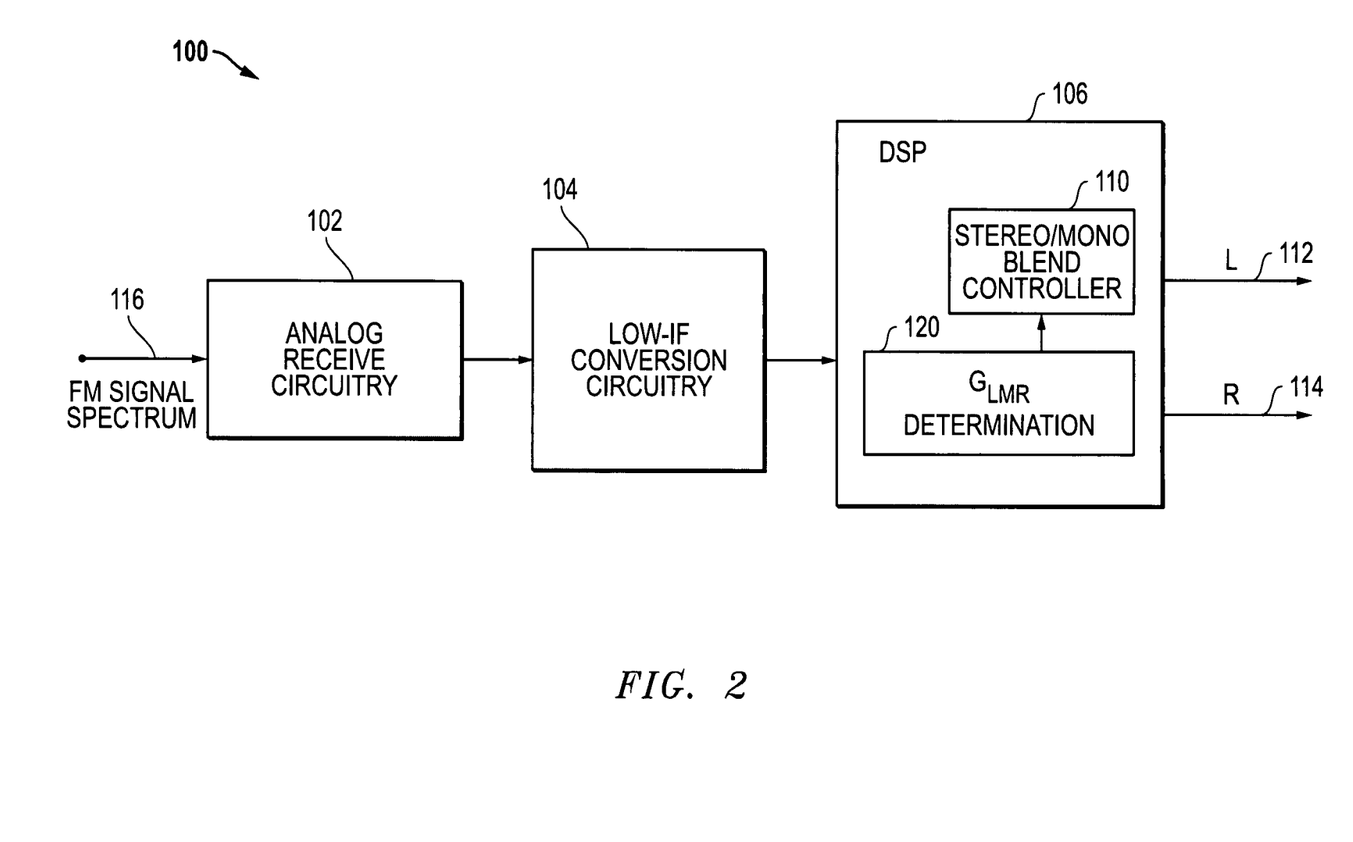
FIG. 2 is a block diagram for an exemplary embodiment including a digital signal processor (DSP) that controls blending between stereo and mono audio output.

FIG. 2 is a block diagram for an embodiment 100 including a digital signal processor (DSP) 106 that controls blending between stereo and mono audio output, for example, in a FM receiver. In the embodiment depicted, an FM signal spectrum 116 including a plurality of FM channels is received by analog receive circuitry 102. The output of the analog receive circuitry 102 is provided to the low-IF conversion circuitry 104. The digital output of the low-IF conversion circuitry is then processed by the DSP 106 to produce digital and/or analog audio output signals. For example, the DSP 106 can produce stereo output signals in the form of a left (L) channel signal 112 and a right (R) channel signal 114.

As described herein, the DSP 106 further provides for processing of the digital signals to blend between stereo and mono based on a determined L−R gain value ($G_{LMR}$), which is equivalent to k in the stereo blending equation. As described above, a mono output is typically created by nulling the (L−R) contribution to the stereo signal such that (L+R) is output on both the right (R) channel signal 114 and on the left (L) channel signal 112. The stereo/mono blend controller 110 within the DSP 106 makes the determination of when to perform the blend from stereo to mono. To make this determination of when to blend from stereo to mono, $G_{LMR}$ determination block 120 determines a value of $G_{LMR}$ and uses this block to generate a blend control signal that is provided to control the stereo/mono blend controller 110, which in turn performs a blend from stereo to mono based thereupon.

Figure 3:
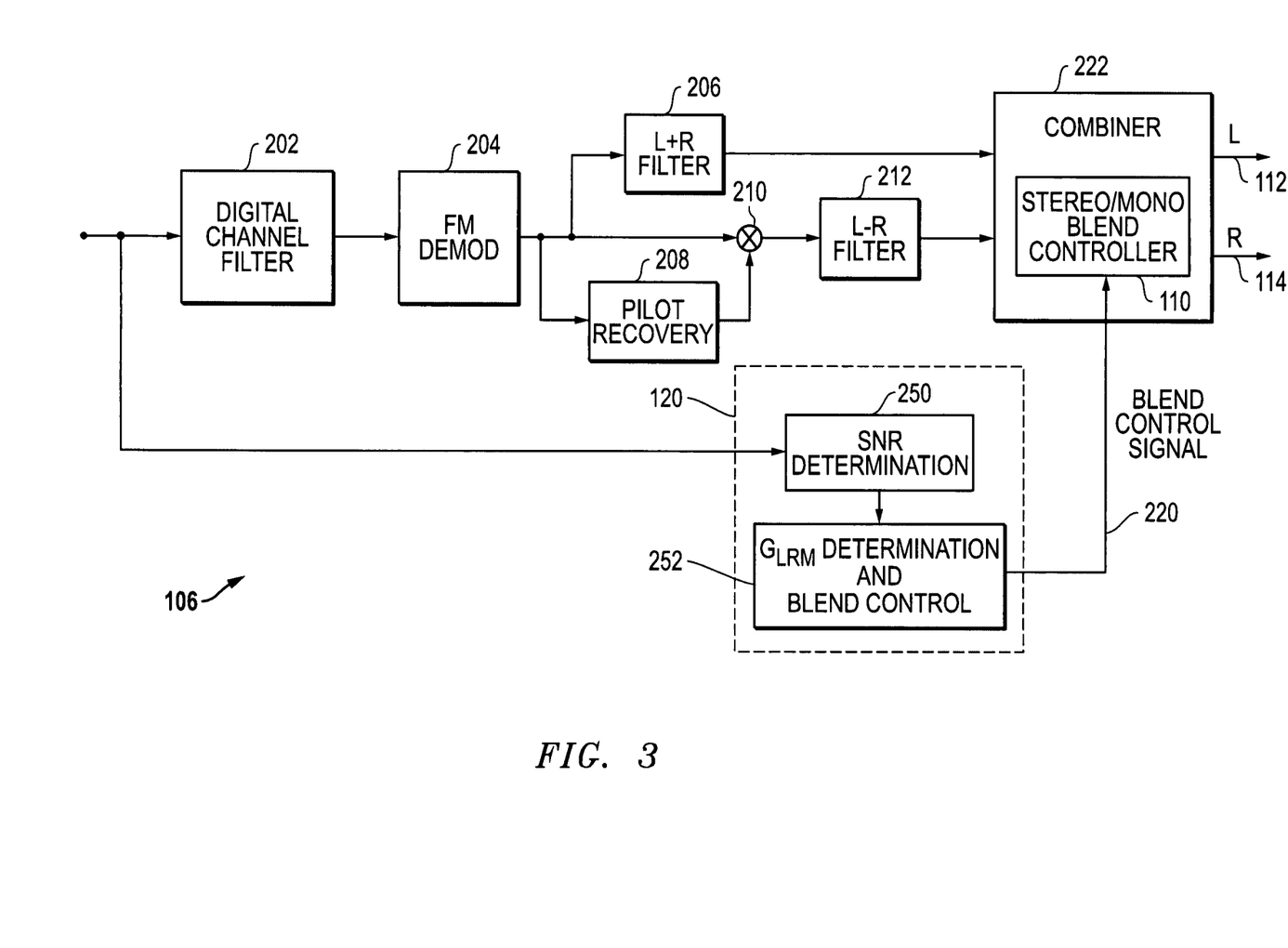
FIG. 3 is a more detailed block diagram for an exemplary embodiment that controls blending between stereo and mono audio output.

FIG. 3 is a more detailed block diagram for one possible exemplary embodiment of the DSP 106 including $G_{LMR}$ determination as described herein. As depicted, a digital channel filter 202 receives a digitized FM stereo MPX signal from the conversion circuitry 104. The output of the digital channel filter 202 is then passed through an FM demodulator (DEMOD) 204. The output of the FM DEMOD 204 is provided to pilot recovery circuitry 208, to digital mixer 210 and to L+R filter 206. The digital mixer 210 mixes the output of the pilot recovery circuitry 208 with the output from the FM DEMOD 204 and sends the resulting signal to the L−R filter 212. The combiner then receives the L+R signal from the L+R filter 206 and the L−R signal from the L−R filter 212. The combiner 222 then adds these two outputs to generate the left (L) channel signal 112 (($L+R$)+$G_{LMR}$*($L-R$)=($1+G_{LMR}$)*$L$+($1-G_{LMR}$)*$R$=$2L$ when $G_{LMR}$=1), and the combiner 222 subtracts these two outputs to generate the right (R) channel signal 114 (($L+R$)−$G_{LMR}$*($L-R$)=($1+G_{LMR}$)*$R$+($1-k$)*$L$=$2R$ when $G_{LMR}$=1). Varying degrees of a blend from stereo to mono can be provided by adjusting or varying $G_{LMR}$ from 1 to 0 to provide the desired level of a blend from stereo to mono. It will be understood that the particular functionalities and configuration of blocks 202, 204, 206, 208, 210, 212 and 222 of FIG. 3 are exemplary only, and that any other circuit arrangement may be employed that is suitable for producing L−R and L+R signals for blending based on a blend control signal from a $G_{LMR}$ determination block 120 in a manner as described below.

As shown in FIG. 3, a SNR determination block 250 of the $G_{LMR}$ determination block 120 also receives the digitized FM stereo MPX signal from the conversion circuitry 104. SNR determination block 250 determines the SNR of the incoming signal (e.g., by analyzing the amplitude modulation in the received FM broadcast signal or any other suitable method) and then provides the measured SNR to $G_{LMR}$ determination and blend control block 252. $G_{LMR}$ determination and blend control block 252 in turn uses the measured SNR to determine a corresponding value of $G_{LMR}$ in a manner described herein in relation to FIG. 5. A blend control signal 220 is then output to the stereo/mono blend controller 110 based upon the determined value of $G_{LMR}$. The blend control signal 220 indicates to the stereo/mono blend controller 110 whether or not to blend to mono and/or how much of a blend from stereo to mono should be made. In other words, the determined $G_{LMR}$ is used to control where and how a blend from stereo to mono is conducted.

It is noted that the DSP 106 may be implemented, if desired, by using a microcontroller and appropriate software code or firmware that may be loaded into memory storage associated with the microcontroller. In addition, the DSP 106 may be implemented with hardware or any suitable combination/s of hardware, firmware and/or software, as desired.

Figure 4:
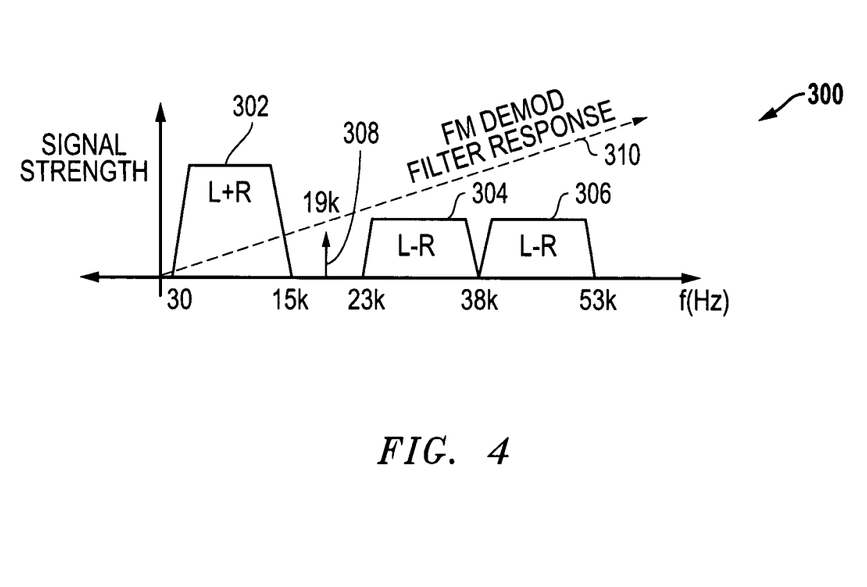
FIG. 4 is a signal diagram for stereo MPX (multiplex) signals and an effective filter response for an FM demodulator.

FIG. 4 is a signal diagram 300 for FM stereo MPX signals and an effective filter response for demodulator circuitry. As described above, the FM stereo MPX signal includes L+R information, L−R information and a 19 KHz pilot tone. The L+R information lies in band 302 between 30 Hz and 15 KHz in the tuned channel. The L−R information sits in two bands on either side of 38 KHz in the tuned channel, namely a first band 304 between 23 KHz and 38 KHz and a second band between 38 KHz and 53 KHz. And the pilot tone 308 sits at 19 KHz. The vertical axis represents signal strength and shows that the L+R energy in the MPX signal is approximately the same strength as the L−R energy when the channel is broadcast. This observation can be made because the L+R magnitude is twice the L−R magnitude, but the modulated L−R occupies twice the bandwidth of the L+R energy. The two effects cancel to give a theoretical equal energy to the two signals. In practice, the L−R energy is always less than the L+R energy, except for artificially generated test conditions. This is a consequence of the nature of audio stereo signals: most of the signal tends to be present on both L and R channels (enhancing the L+R energy relative to the L−R energy), and much less energy is needed to create the remaining "separation" signal (the L−R energy).

In normal operation, in a noise free environment, the L+R energy is expected to be greater than or equal to the L−R energy As signal conditions worsen, however, the L−R energy experiences more noise than L+R. This is a consequence of the frequency dependent gain of the FM demodulator (i.e., the FM demodulator filter response 310 shown in FIG. 4). It is further noted that when silence or low volume is broadcast on an FM channel being received with a good signal quality and signal strength, a user may still tend to hear noise on the L−R channel. This silence or low volume condition often occurs, for example, in broadcasts having large dynamic range variations from soft to loud, such as for classical music station broadcasts.

Using the disclosed methods and systems, the L−R (left-minus-right) gain of the FM MPX may be adjusted as a function of RF SNR and the L+R (left-plus-right) noise level. In particular, given that the audio noise in both the L−R and L+R signals increases (e.g., on a dB by dB basis) as the RF SNR decreases, the disclosed methods and systems may be implemented to reduce the L−R gain based on the RF SNR and L+R noise in a manner such that the total noise is kept substantially constant throughout the stereo-to-mono blend region.

In one particular exemplary embodiment, an equation for determining $G_{LMR}$ (i.e., k value) may be employed that is developed as follows:
Definitions
LMR—The left−right MPX channel
LPR—The left+right MPX channel
$SNR_T$—The RF SNR at which blending begins
$N_T$—The audio noise level at $SNR_T$
$K_d$—The ratio of the LMR:LPR noise unblended ($G_{LMR}=1$)
$G_{LMR}$—The LMR Gain=k
Assumptions:
1. The LMR and LPR noise increases 1 dB for every 1 dB drop in SNR
2. The LPR noise contribution when $G_{LMR}=1$ can be neglected.

The total noise in output audio ($N_A$) is given by:

$$N_A = (N_{LMR}^2 + N_{LPR}^2)^{1/2} \quad \text{(Equation 1)}$$

Applying $G_{LMR}$ and $K_d$, Equation 1 can be rewritten as:

$$N_A = (G_{LMR}^2 N_{LMR}^2 + K_d^2 N_{LMR}^2)^{1/2} \quad \text{(Equation 2)}$$
$$= ((G_{LMR}^2 + K_d^2) \cdot N_{LMR}^2)^{1/2}$$

$G_{LMR}$ is to be varied to keep $N_A$ constant in the blend region, thus $G_{LMR}$ is solved for and $N_A$ is defined as a constant $N_T$, the noise threshold where blending will begin:

$$N_T^2 = (G_{LMR}^2 + K_d^2) \cdot N_{LMR}^2 \quad \text{(Equation 3)}$$

or $$\frac{N_T^2}{N_{LMR}^2} - K_d^2 = G_{LMR}^2$$

Using assumptions 1 and 2 and recognizing that when the SNR is at the blend threshold $SNR_T$:

$$SNR = SNR_T$$

and $$N_T = N_{LMR} \quad \text{(uses assumption 2)}$$

Therefore:

$$1 = \frac{N_T^2}{N_{LMR}^2} = \frac{SNR^2}{SNR_T^2} \quad \text{(uses assumption 1)}$$

Next, Equation 3 can be put in terms of SNR and $G_{LMR}$ to give:

$$\frac{SNR^2}{SNR_T^2} - K_d^2 = G_{LMR}^2 \quad \text{(Equation 4)}$$

Equation 4 is the general blend case and is valid in blend region:

$$SNR \leq SNR_T \text{ and } G_{LMR} \geq 0$$

Equation 4 may be put into the log domain to yield:

$$10 \log \left( \frac{SNR^2 - SNR_T^2 K_d^2}{SNR_T^2} \right) = 10 \log(G_{LMR}^2)$$

or $$10 \log[(SNR + SNR_T K_d)(SNR - SNR_T K_d)] - 10 \log(SNR_T^2) = 10 \log(G_{LMR}^2)$$

Which gives:

$$10 \log[(SNR + SNR_T K_d)] + 10 \log[SNR - SNR_T K_d] - 10 \log(SNR_T^2) = 10 \log(G_{LMR}^2)$$

If $X_{SNR+}$ is defined as: $(SNR + SNR_T K_d)$, and $X_{SNR-}$ is defined as: $(SNR - SNR_T K_d)$; then Equation 5 becomes:

$$\tfrac{1}{2}[X_{SNR+}(dB) + X_{SNR-}(dB)] - SNR_T(dB) = G_{LMR}(dB) \quad \text{(Equation 6)}$$

If the noise contribution of the LPR channel ($K_d$=0) is neglected, Equation 6 becomes:

$$SNR(dB) - SNR_T(dB) = G_{LMR}(dB) \quad \text{(Equation 7)}$$

Equation 7 is valid in the range:

$$0 \leq G_{LMR} \leq 1 \text{ and } SNR \leq SNR_T$$

Thus, when $SNR > SNR_T$:
$G_{LMR}$ is set to 1 (0 dB).
For Equation 7, the limits in decibel terms are:

$$-\infty < G_{LMR}(dB) \leq 0 \text{ and } SNR(dB) \leq SNR_T(dB);$$

and
The limits for Equation 7 in linear terms are:

$$0 \leq G_{LMR} \leq 1$$

Figure 5:
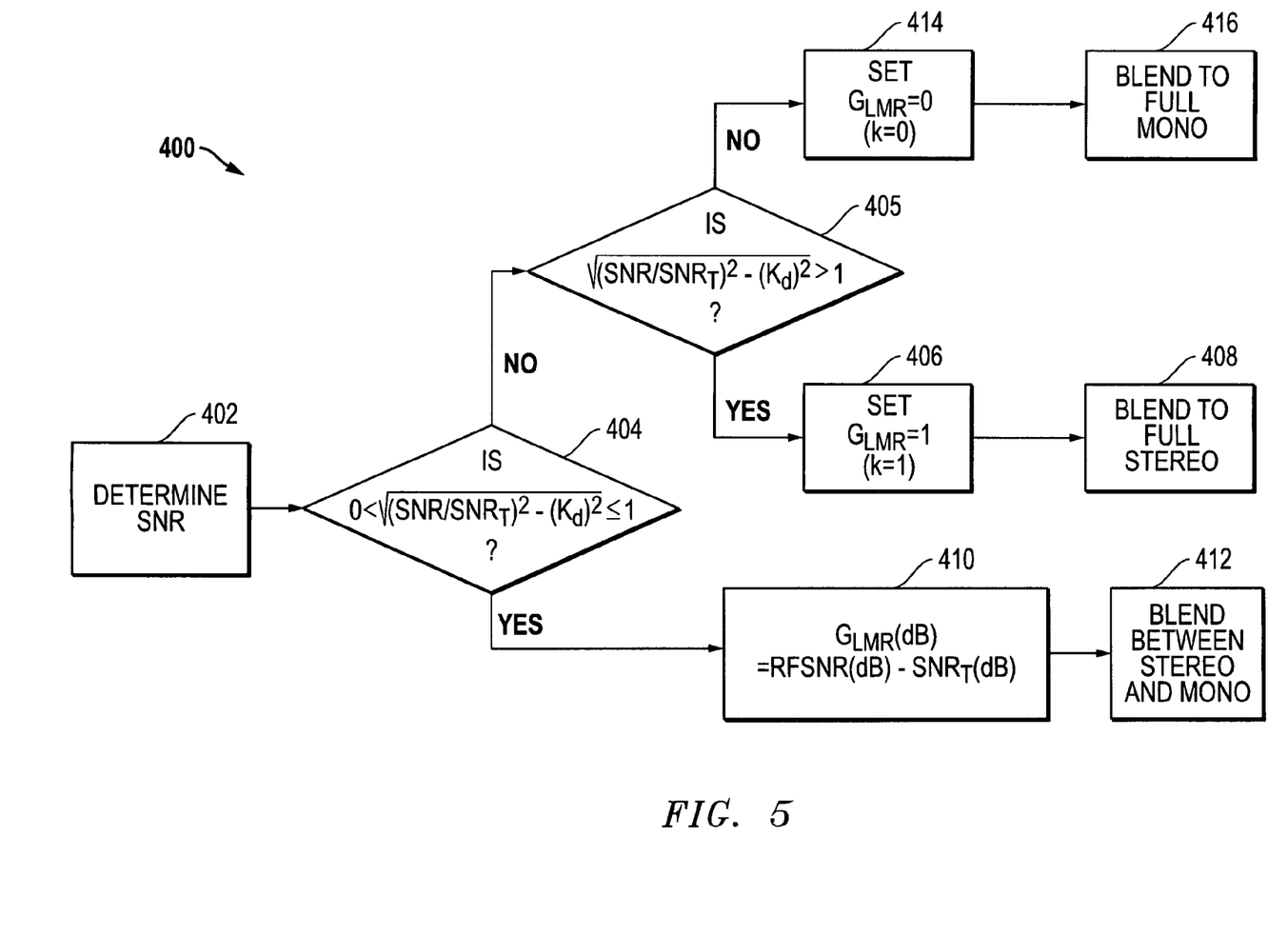
FIG. 5 is a flow diagram for blending from stereo to mono according to one exemplary embodiment of the disclosed methods and systems.

FIG. 5 is a flow diagram of an embodiment 400 for determining $G_{LMR}$ and blending from stereo to mono based upon the $G_{LMR}$ determination. As shown in FIG. 5, the SNR of the received FM broadcast signal is determined in block 402. Next, in step 404, the value of $\sqrt{(SNR/SNR_T)^2 - (K_d)^2}$ is determined. $K_d$ is the ratio of the output signal including the L−R energy to the output signal including the L+R energy, and $SNR_T$ may be, for example, a pre-selected RF SNR value that corresponds to a selected audio noise SNR threshold below which blending away from full stereo is desired. $SNR_T$ may be selected, for example, from an empirical correlation of audio noise SNR values versus corresponding RF SNR values derived from testing of the RF receiver circuitry. Table 1 is an example correlation of audio noise SNR values versus corresponding RF SNR values, in which there is a 1:1 relationship between audio SNR and RF SNR. Although such a linear relationship of audio SNR to RF SNR is not necessary, it is often found to exist within the SNR range of interest. In any case, in one exemplary embodiment, a minimum value of audio SNR may be first selected based on requirements of a given receiver application. Then a threshold RF SNR value ($SNR_T$) corresponding to the selected threshold audio SNR value may be determined (e.g., from a table or plot of correlation data such as shown in FIG. 1).

TABLE 1

| Audio SNR (dB) | RF SNR (dB) |
|---|---|
| 40 | 45 |
| 39 | 44 |
| 38 | 43 |
| ... | ... |

Returning to FIG. 5, if the relationship $0 \leq \sqrt{(SNR/SNR_T)^2 - (K_d)^2} \leq 1$ is determined to be true in step 404, then the flow proceeds to block 410 where $G_{LMR}$ (dB) is determined by subtracting $SNR_T$ from the incoming RF signal SNR determined in block 402. Using the technique of this embodiment, the result of the determination in block 410 may be a value of $G_{LMR}$ (dB) that is 0 dB (in the case where $SNR = SNR_T$) to a negative value, depending on the magnitude of the incoming RF signal SNR. In this regard, a linear value of $G_{LMR}$ may be assigned based on the value of $G_{LMR}$ in decibels, e.g., $G_{LMR}=1$ for $G_{LMR}$ (dB)=0, and $G_{LMR}=0$ for $G_{LMR}$ (dB)=minus infinity. Based on decibel values of $G_{LMR}$, linear values of $G_{LMR}$ between 0 and 1 may be assigned according to $\sqrt{(SNR/SNR_T)^2 - (K_d)^2} = G_{LMR}$, in the range $0 \leq G_{LMR} \leq 1$. The flow then proceeds to block 412 where the audio output is blended between stereo and mono using the appropriate $G_{LMR}$ value determined in block 410.

However, if the relationship $0 \leq \sqrt{(SNR/SNR_T)^2 - (K_d)^2} \leq 1$ is determined not to be true in step 404 of FIG. 5, then the flow proceeds to block 405 where it is determined if the value of $\sqrt{(SNR/SNR_T)^2 - (K_d)^2}$ is greater than 1. If the value of $\sqrt{(SNR/SNR_T)^2 - (K_d)^2}$ is found to be greater than 1 in step 405, then the flow proceeds to step 406 where $G_{LMR}$ is set to a value of 1 for the blending equations $(L+R) + G_{LMR}(L-R)$ for left channel and $(L+R) - G_{LMR}*(L-R)$ for right channel. The flow then proceeds from block 406 to block 408, where the audio output is blended to full stereo using the appropriate $G_{LMR}=1$ value.

Still referring to FIG. 5, if the value of $\sqrt{(SNR/SNR_T)_2 - (K_d)^2}$ is found not to be greater than 1 in step 405 (i.e., value of $\sqrt{(SNR/SNR_T)^2 - (K_d)^2}$ is 0), then the flow proceeds to step 414 where $G_{LMR}$ is set to a value of 0 for the blending equations $(L+R) + G_{LMR}(L-R)$ for left channel and $(L+R) - G_{LMR}*(L-R)$ for right channel. The flow then proceeds from block 406 to block 408, where the audio output is blended to full mono using the appropriate $G_{LMR}=0$ value. It will be understood that the particular order and number of steps in FIG. 5 is exemplary only, and that any other order and/or combination of additional and/or alternative steps may be employed that is suitable for blending the audio output from a received FM signal in a manner consistent with the disclosed techniques disclosed herein.

Figure 6:
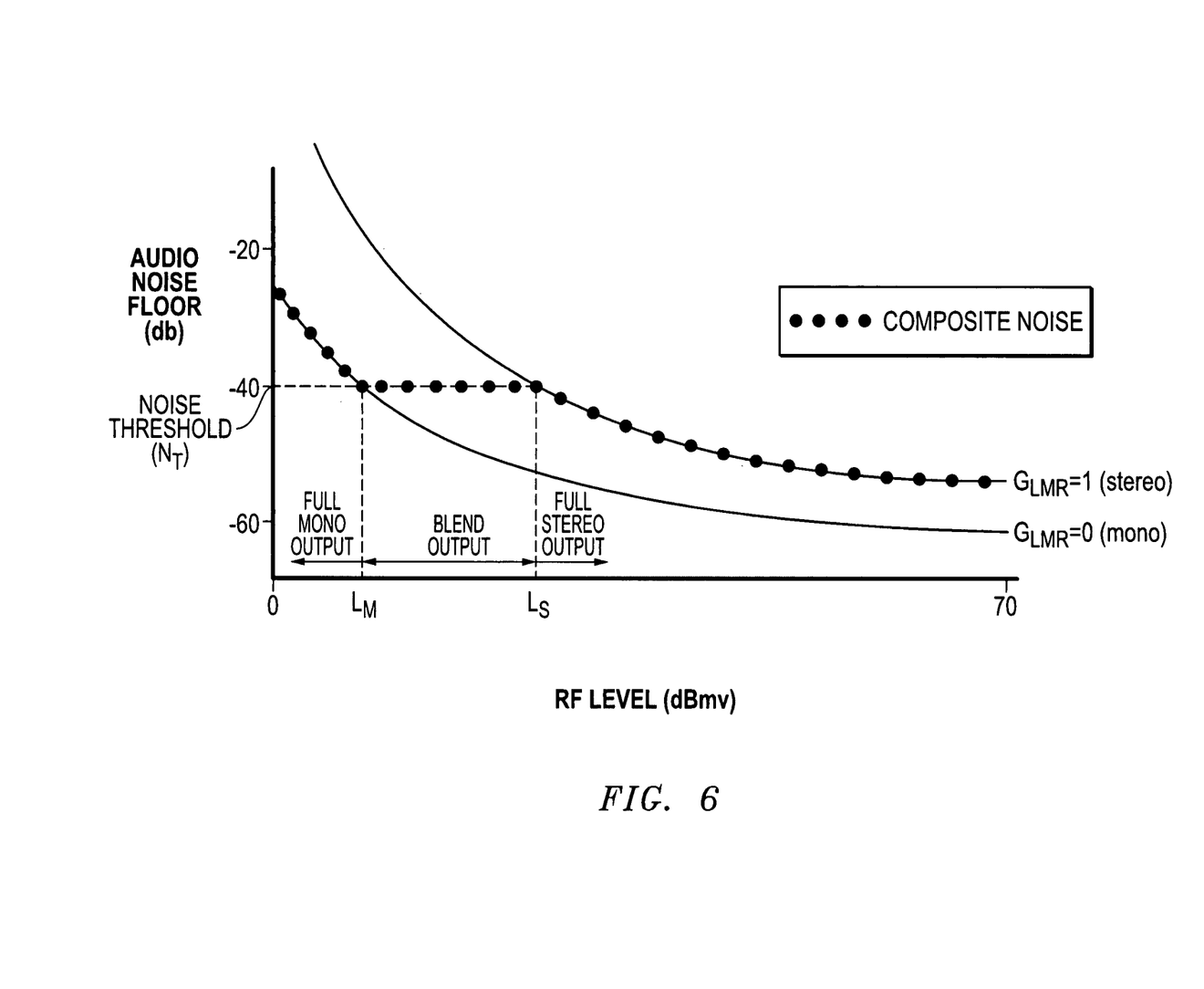
FIG. 6 illustrates a plot of audio noise floor versus received RF strength that is typical of the results of the disclosed methods and systems for blending from stereo to mono audio output.

FIG. 6 illustrates a plot of audio noise floor versus received RF strength that is typical of the results of the disclosed methods and systems for blending from stereo to mono audio output based on determination of L−R gain value ($G_{LMR}$) for a received incoming FM radio frequency (RF) using methodology and systems as described in relation to FIGS. 2-5. As shown in FIG. 6, the audio output is full stereo ($G_{LMR}=1$) for received RF level values greater than or equal to minimum full stereo RF level $L_S$ and is full mono ($G_{LMR}=0$) for received RF level values less than or equal to maximum full mono RF level $L_M$. Further, the composite noise level increases monotonically from right to left (with decreasing RF level) as shown.

Still referring to FIG. 6, at received RF levels between $L_S$ and $L_M$ the audio output is blended in a manner that is substantially flat relative to audio noise floor so that the slope of the composite noise curve in the blend region of FIG. 6 is substantially equal to zero, i.e., no "noise hump" is present in the audio output curve. This means that while in full or partial stereo mode, the composite noise does not exceed the audio noise threshold value ($N_T$) which intersects the minimum full stereo curve ($G_{LMR}=1$) at the minimum full stereo level ($L_S$). As noted before, the threshold $N_T$ represents the noise level above which full stereo audio output is undesirable and blending between stereo and mono should occur to make the listening experience more pleasurable. Thus, for a given desired audio SNR (corresponding to a desired threshold $N_T$), audio output may remain in full stereo mode down to a lower RF SNR. Further, it may be seen that that the substantially flat composite noise curve between $L_S$ and $L_M$ also does not drop below the audio noise threshold value $N_T$. This allows for a wider blend region between $L_S$ and $L_M$ which results in the expansion of the blend region so that for a given desired audio SNR (corresponding to a desired threshold $N_T$), audio output may remain in partial stereo mode down to a lower RF SNR.

It will be understood that the disclosed $G_{LMR}$ determination technique may be used in conjunction with other techniques that may indicate that a blend from stereo to mono should be conducted during such periods of silence and/or under other selected conditions. In this regard, the blend controller may be configured to determine how each of the included techniques are ultimately used to control the actual blend to mono for the receiver system. As such, the $G_{LMR}$ determination technique described herein may be used in conjunction with one or more other techniques, such as the RSSI technique and/or the multi-path or L−R>L+R technique/s described in U.S. patent application Ser. No. 12/313,044 which has been incorporated herein by reference in its entirety.

It will also be understood that one or more of the tasks, functions, or methodologies described herein may be implemented, for example, as firmware or other computer program of instructions embodied in a non-transitory tangible computer readable medium that is executed by a CPU, microcontroller, or other suitable processing device.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method for blending between stereo and mono signal output in FM broadcast receivers, comprising:
   receiving an FM channel having a spectrum including L+R (left-plus-right) energy and L−R (left-minus-right) energy;
   determining a radio frequency (RF) signal-to-noise ratio (SNR) of the received FM channel;
   determining a L−R gain ($G_{LMR}$) of the received FM channel as a function of RF SNR; and
   controlling the blending from a stereo output signal into a mono output signal based on the determined $G_{LMR}$ such that an audio noise SNR threshold value ($N_T$) corresponding to a minimum full stereo RF level ($L_S$) is never exceeded while in partial stereo mode.

2. The method of claim 1, further comprising:
   determining the $G_{LMR}$ of the received FM channel by determining the difference between the RF SNR of the received FM channel and a threshold RF SNR value ($SNR_T$);
   wherein the step of controlling comprises blending from a full stereo output signal into a full mono output signal only if the determined RF SNR is found to be less than or equal to the $SNR_T$, and otherwise maintaining a full stereo output signal if the determined RF SNR is found to be greater than the $SNR_T$.

3. The method of claim 2, wherein the $SNR_T$ is a preselected RF SNR value that corresponds to the selected audio noise SNR threshold value ($N_T$) below which blending away from full stereo output signal to at least partial mono output signal is desired.

4. The method of claim 3, further comprising selecting the value of $SNR_T$ from an empirical correlation of audio noise SNR values to corresponding RF SNR values.

5. The method of claim 4, further comprising testing circuitry of an FM broadcast receiver to derive the empirical correlation of audio noise SNR values to corresponding RF SNR values.

6. The method of claim 2, wherein the step of controlling comprises blending completely from a full stereo output signal to a full mono output signal as the difference between RF SNR and $SNR_T$ increases when the RF SNR is found to be less than or equal to the $SNR_T$.

7. The method of claim 1, further comprising:
   comparing the determined RF SNR to the threshold RF SNR value ($SNR_T$);
   then determining the $G_{LMR}$ of the received FM channel based on the results of the comparing step by one of the following steps:
      setting $G_{LMR}$ to a value between 1 and 0 based on the relative linear difference between the RF SNR of the received FM channel and the threshold RF SNR value ($SNR_T$) if the determined RF SNR is found in the comparing step to be less than or equal to the $SNR_T$, or
      setting $G_{LMR}$ of the received FM channel to be equal to 1 if the determined RF SNR is found in the comparing step to be greater than the $SNR_T$; and
   then controlling the blending from a stereo output signal into a mono output signal by maintaining a full stereo output signal if $G_{LMR}$ is equal to 1, and blending completely from a full stereo signal to a full mono signal as the value of $G_{LMR}$ decreases from 1 to 0 such that the selected audio noise SNR threshold value ($N_T$) is never exceeded when the determined value of $G_{LMR}$ is between 1 and 0.

8. The method of claim 1, further comprising:
   determining the $G_{LMR}$ of the received FM channel by determining the difference between the RF SNR of the received FM channel and a threshold RF SNR value ($SNR_T$);
   controlling blending from a full stereo output signal into a full mono output signal only if the relationship $0 < \sqrt{(SNR/SNR_T)^2 - (K_d)^2} \leq 1$ is true, where $K_d$ is a ratio of output signal including L−R noise to output signal including L+R noise; and
   otherwise maintaining a full stereo output signal if $\sqrt{(SNR/SNR_T)^2 - (K_d)^2} > 1$ or maintaining a full mono output if $\sqrt{(SNR/SNR_T)^2 - (K_d)^2} < 1$.

9. The FM broadcast receiver system of claim 8, wherein the $SNR_T$ is a pre-selected RF SNR value that corresponds to a selected audio noise SNR threshold below which blending away from full stereo output signal to at least partial mono output signal is desired.

10. The FM broadcast receiver system of claim 9, wherein the $SNR_T$ is a value that is pre-selected from an empirical correlation of audio noise SNR values to corresponding RF SNR values.

11. The FM broadcast receiver system of claim 10, wherein the empirical correlation of audio noise SNR values to corresponding RF SNR values is derived from testing the circuitry of an FM broadcast receiver.

12. The method of claim 1, where a determined $G_{LMR}$ value of 1 corresponds to a full stereo output signal; where a determined $G_{LMR}$ value of 0 corresponds to a full mono output signal; where a determined $G_{LMR}$ value between 0 and 1 corresponds to a blend between a full stereo output signal and full mono output signal; and where the method further comprises:
   determining a $G_{LMR}$ value of to 1 to produce a full stereo output signal when the received RF strength of the FM channel is greater than or equal to the minimum full stereo RF level ($L_S$);
   determining a $G_{LMR}$ value of less than 1 and greater than 0 to produce a blend between a full stereo output signal and a full mono output signal when the received RF strength of the FM channel is less than the minimum full stereo RF level ($L_S$) and greater than a maximum full mono RF level (LM); and determining a $G_{LMR}$ value of 0 to produce a full mono output signal when the received RF strength of the FM channel is determined to be less or equal to the maximum full mono RF level (LM);

where the specified audio noise threshold ($N_T$) corresponds to the audio noise level produced at the minimum full stereo RF level ($L_S$) when in full stereo mode; and where the specified audio noise threshold ($N_T$) is never exceeded when the received RF strength of the FM channel is determined to be less than the minimum full stereo RF level ($L_S$) and greater than a maximum full mono RF level (LM).

13. The method of claim 1, further comprising blending between a full stereo output signal and a mono output signal below a minimum full stereo RF level ($L_S$) and above the minimum full stereo RF level ($L_S$); and where the specified audio noise threshold ($N_T$) is equal to the value of composite noise at the minimum full stereo RF level ($L_S$).

14. The method of claim 1, further comprising controlling the blending from a stereo output signal into a mono output signal based on the determined $G_{LMR}$ such that a specified audio noise threshold ($N_T$) is never exceeded while in partial stereo mode.

15. The method of claim 1, further comprising controlling the blending from a stereo output signal into a mono output signal based on the determined $G_{LMR}$ to maintain a substantially flat audio output at the specified audio noise threshold ($N_T$) without exceeding the specified audio noise threshold ($N_T$) while in partial stereo mode.

16. The method of claim 1, further comprising:
determining the $G_{LMR}$ of the received FM channel by determining the difference between the RF SNR of the received FM channel and a threshold RF SNR value ($SNR_T$); and
controlling blending of stereo and mono output signals as the difference between RF SNR and $SNR_T$ increases when the relationship $0 < \sqrt{(SNR/SNR_T)^2 - (K_d)^2} \leq 1$ is true;
where $K_d$ is a ratio of output signal including L−R noise to output signal including L+R noise.

17. An FM broadcast receiver system, comprising:
analog receive circuitry configured to receive an FM channel having a spectrum including L+R (left-plus-right) energy and L−R (left-minus-right) energy;
conversion circuitry configured to receive analog signals from the receive circuitry and to output digital signals including L+R energy and L−R energy; and
digital signal processing (DSP) circuitry coupled to receive the digital signals from the conversion circuitry, the DSP circuitry being configured to determine a radio frequency (RF) signal-to-noise ratio (SNR) of the received FM channel, determine a L−R gain ($G_{LMR}$) of the received FM channel as a function of RF signal to noise ratio (SNR), and control blending from a stereo output signal into a mono output signal based on the determined $G_{LMR}$ such that an audio noise SNR threshold value ($N_T$) corresponding to a minimum full stereo RF level ($L_S$) is never exceeded while in partial stereo mode.

18. The FM broadcast receiver system of claim 17, An FM broadcast receiver system, comprising:
analog receive circuitry configured to receive an FM channel having a spectrum including L+R (left-plus-right) energy and L−R (left-minus-right) energy;
conversion circuitry configured to receive analog signals from the receive circuitry and to output digital signals including L+R energy and L−R energy; and
digital signal processing (DSP) circuitry coupled to receive the digital signals from the conversion circuitry, the DSP circuitry being configured to determine a radio frequency (RF) signal-to-noise ratio (SNR) of the received FM channel, determine a L−R gain ($G_{LMR}$) of the received FM channel as a function of RF signal to noise ratio (SNR) and the L+R (left-plus-right) noise level, and control blending from a stereo out signal into a mono out signal based on the determined $G_{LMR}$;

wherein the DSP circuitry is further configured to:
determine the $G_{LMR}$ of the received FM channel by determining the difference between the RF SNR of the received FM channel and a threshold RF SNR value ($SNR_T$),
determine a ratio ($K_d$) of the output signal including the L−R energy to the output signal including the L+R energy, and
control blending of stereo and mono output signals as the difference between RF SNR and $SNR_T$ increases when the relationship $0 < \sqrt{(SNR/SNR_T)^2 - (K_d)^2} \leq 1$ is true.

19. The FM broadcast receiver system of claim 17, wherein the DSP circuitry is further configured to:
compare the determined RF SNR to a threshold RF SNR value ($SNR_T$);
then determine the $G_{LMR}$ of the received FM channel based on the results of the comparison of the determined RF SNR to $SNR_T$ in the following manner:
by setting $G_{LMR}$ to a value between 1 and 0 based on the relative linear difference between the RF SNR of the received FM channel and the threshold RF SNR value ($SNR_T$) if the determined RF SNR is found in the comparing step to be less than or equal to the $SNR_T$, or
by setting $G_{LMR}$ of the received FM channel to be equal to 1 if the determined RF SNR is found in the comparing step to be greater than the $SNR_T$; and
then control the blending from a stereo output signal into a mono output signal by maintaining a full stereo output signal if $G_{LMR}$ is equal to 1, and blending completely from a full stereo output signal to a full mono output signal as the value of $G_{LMR}$ decreases from 1 to 0.

20. The FM broadcast receiver system of claim 17, wherein the DSP circuitry comprises a digital channel filter, an FM demodulator, a L+R filter, a L−R filter, and a $G_{LMR}$ determination block.

21. The FM broadcast receiver system of claim of claim 20, wherein the combiner further comprises a combiner configured to output a left (L) channel output signal and a right (R) channel output signal as audio output signals and a blend controller configured to control the blend from stereo to mono for the audio output signals.

22. The FM broadcast receiver system of claim 17, wherein the DSP circuitry comprises a microcontroller configured to run firmware stored in memory storage associated with the microcontroller.

23. The FM broadcast receiver system of claim 17, wherein the DSP circuitry is further configured to:
determine the $G_{LMR}$ of the received FM channel by determining the difference between the RF SNR of the received FM channel and a threshold RF SNR value ($SNR_T$);
control blending from a full stereo output signal into a full mono output signal only if the relationship $0 <$ $\sqrt{(SNR/SNR_T)^2-(K_d)^2} \leq 1$ is true, where $K_d$ is a ratio of output signal including L−R noise to output signal including L+R noise; and otherwise maintain a full stereo output signal if $\sqrt{(SNR/SNR_T)^2-(K_d)^2} > 1$ or maintaining a full mono output if $\sqrt{(SNR/SNR_T)^2-(K_d)^2} < 1$.

24. The FM broadcast receiver system of claim 17, wherein the DSP circuitry is further configured to:
   determine the $G_{LMR}$ of the received FM channel by determining the difference between the RF SNR of the received FM channel and a threshold RF SNR value ($SNR_T$); and
   control blending of stereo and mono output signals as the difference between RF SNR and $SNR_T$ increases when the relationship $0 < \sqrt{(SNR/SNR_T)^2-(K_d)^2} \leq 1$ is true;
   where $K_d$ is a ratio of output signal including L−R noise to output signal including L+R noise.

25. The FM broadcast receiver system of claim 17, where a determined $G_{LMR}$ value of 1 corresponds to a full stereo output signal; where a determined $G_{LMR}$ value of 0 corresponds to a full mono output signal; where a determined $G_{LMR}$ value between 0 and 1 corresponds to a blend between a full stereo output signal and full mono output signal; and where the DSP circuitry is further configured to:
   determine a $G_{LMR}$ value of to 1 to produce a full stereo output signal when the received RF strength of the FM channel is determined to be greater than or equal to the minimum full stereo RF level ($L_S$);
   determine a $G_{LMR}$ value of less than 1 and greater than 0 to produce a blend between a full stereo output signal and a full mono output signal when the received RF strength of the FM channel is determined to be less than the minimum full stereo RF level ($L_S$) and greater than a maximum full mono RF level (LM); and
   determine a $G_{LMR}$ value of 0 to produce a full mono output signal when the received RF strength of the FM channel is determined to be less or equal to the maximum full mono RF level (LM);
   where the specified audio noise threshold ($N_T$) corresponds to the audio noise level produced at the minimum full stereo RF level ($L_S$) when in full stereo mode; and
   where the specified audio noise threshold ($N_T$) is never exceeded when the received RF strength of the FM channel is determined to be less than the minimum full stereo RF level ($L_S$) and greater than a maximum full mono RF level (LM).

26. The FM broadcast receiver system of claim 17, where the DSP circuitry is further configured to blend between a full stereo output signal and a mono output signal below a minimum full stereo RF level ($L_S$) and above the minimum full stereo RF level ($L_S$); and where the specified audio noise threshold ($N_T$) is equal to the value of composite noise at the minimum full stereo RF level ($L_S$).

27. The FM broadcast receiver system of claim 17, where the DSP circuitry is further configured to control the blending from a stereo output signal into a mono output signal based on the determined $G_{LMR}$ such that a specified audio noise threshold ($N_T$) is never exceeded while in partial stereo mode.

28. The FM broadcast receiver system of claim 17, where the DSP circuitry is further configured to control the blending from a stereo output signal into a mono output signal based on the determined $G_{LMR}$ to maintain a substantially flat audio output at the specified audio noise threshold ($N_T$) without exceeding the specified audio noise threshold ($N_T$) while in partial stereo mode.

29. An FM broadcast receiver system, comprising:
   analog receive circuitry configured to receive an FM channel having a spectrum including L+R (left-plus-right) energy and L−R (left-minus-right) energy;
   conversion circuitry configured to receive analog signals from the receive circuitry and to output digital signals including L+R energy and L−R energy; and
   digital signal processing (DSP) circuitry coupled to receive the digital signals from the conversion circuitry, the DSP circuitry being configured to determine a radio frequency (RF) signal-to-noise ratio (SNR) of the received FM channel, determine a L−R gain ($G_{LMR}$) of the received FM channel as a function of RF signal to noise ratio (SNR) and the L+R (left-plus-right) noise level, and control blending from a stereo output signal into a mono out signal based on the determined $G_{LMR}$;
   wherein the DSP circuitry is further configured to:
      determine the $G_{LMR}$ of the received FM channel by determining the difference between the RF SNR of the received FM channel and a threshold RF SNR value ($SNR_T$),
      determine a ratio ($K_d$) of the output signal including the L−R energy to the output signal including the L+R energy,
      control blending from a full stereo output signal into a full mono output signal only if the relationship $0 < \sqrt{(SNR/SNR_T)^2-(K_d)^2} \leq 1$ is true, and
      otherwise maintain a full stereo output signal if $\sqrt{(SNR/SNR_T)^2-(K_d)^2} > 1$ or maintaining a full mono output if $\sqrt{(SNR/SNR_T)^2-(K_d)^2} < 1$.

* * * * *

UNITED STATES PATENT AND TRADEMARK OFFICE
CERTIFICATE OF CORRECTION

PATENT NO. : 8,417,206 B2
APPLICATION NO. : 12/799983
DATED : April 9, 2013
INVENTOR(S) : John Allen et al.

It is certified that error appears in the above-identified patent and that said Letters Patent is hereby corrected as shown below:

In the Claims:

In claim 9, column 10, line 39, change "8," to --23--.

In claim 12, column 10, line 59, change "of to 1" to --of 1--.

In claim 18, column 11, line 62, delete "The FM broadcast receiver system of claim 17,".

Signed and Sealed this
Second Day of July, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,417,206 B2
APPLICATION NO. : 12/799983
DATED : April 9, 2013
INVENTOR(S) : John Allen et al.

It is certified that error appears in the above-identified patent and that said Letters Patent is hereby corrected as shown below:

In the Claims:

In claim 12, column 11, line 3, change "(LM)," to --($L_M$)--.

In claim 12, column 11, line 7, change "(LM)," to --($L_M$)--.

In claim 12, column 11, line 15, change "(LM)," to --($L_M$)--.

In claim 13, column 11, line 18, change "below a minimum" to --below the minimum--.

In claim 13, column 11, lines 18-19, change "above the minimum full stereo RF level ($L_S$)" to --above a maximum full mono RF level ($L_M$)--.

In claim 25, column 13, line 36, change "(LM)," to --($L_M$)--.

In claim 25, column 13, line 40, change "(LM)," to --($L_M$)--.

In claim 25, column 13, line 48, change "(LM)," to --($L_M$)--.

In claim 26, column 14, lines 1-2, change "below a minimum" to --below the minimum--.

In claim 26, column 14, lines 2-3, change "above the minimum full stereo RF level ($L_S$)" to --above a maximum full mono RF level ($L_M$)--.

Signed and Sealed this
Nineteenth Day of November, 2013

Teresa Stanek Rea
*Deputy Director of the United States Patent and Trademark Office*

UNITED STATES PATENT AND TRADEMARK OFFICE
CERTIFICATE OF CORRECTION

PATENT NO. : 8,417,206 B2  
APPLICATION NO. : 12/799983  
DATED : April 9, 2013  
INVENTOR(S) : John L. Allen et al.

Page 1 of 1

It is certified that error appears in the above-identified patent and that said Letters Patent is hereby corrected as shown below:

In the Claims  
Column 10, line 39, Claim 9, "23" (as corrected to read in the Certificate of Correction issued July 2, 2013) should be deleted and patent is to be reinstated to read -- 8 --.

Signed and Sealed this  
Third Day of December, 2013

Margaret A. Focarino  
*Commissioner for Patents of the United States Patent and Trademark Office*